Sept. 14, 1937.  E. E. POULIN  2,092,857
BREAD SLICING MACHINE
Filed Sept. 8, 1934  5 Sheets-Sheet 1

INVENTOR
*Edmond E. Poulin*
BY
*Chapin + Neal*
ATTORNEYS

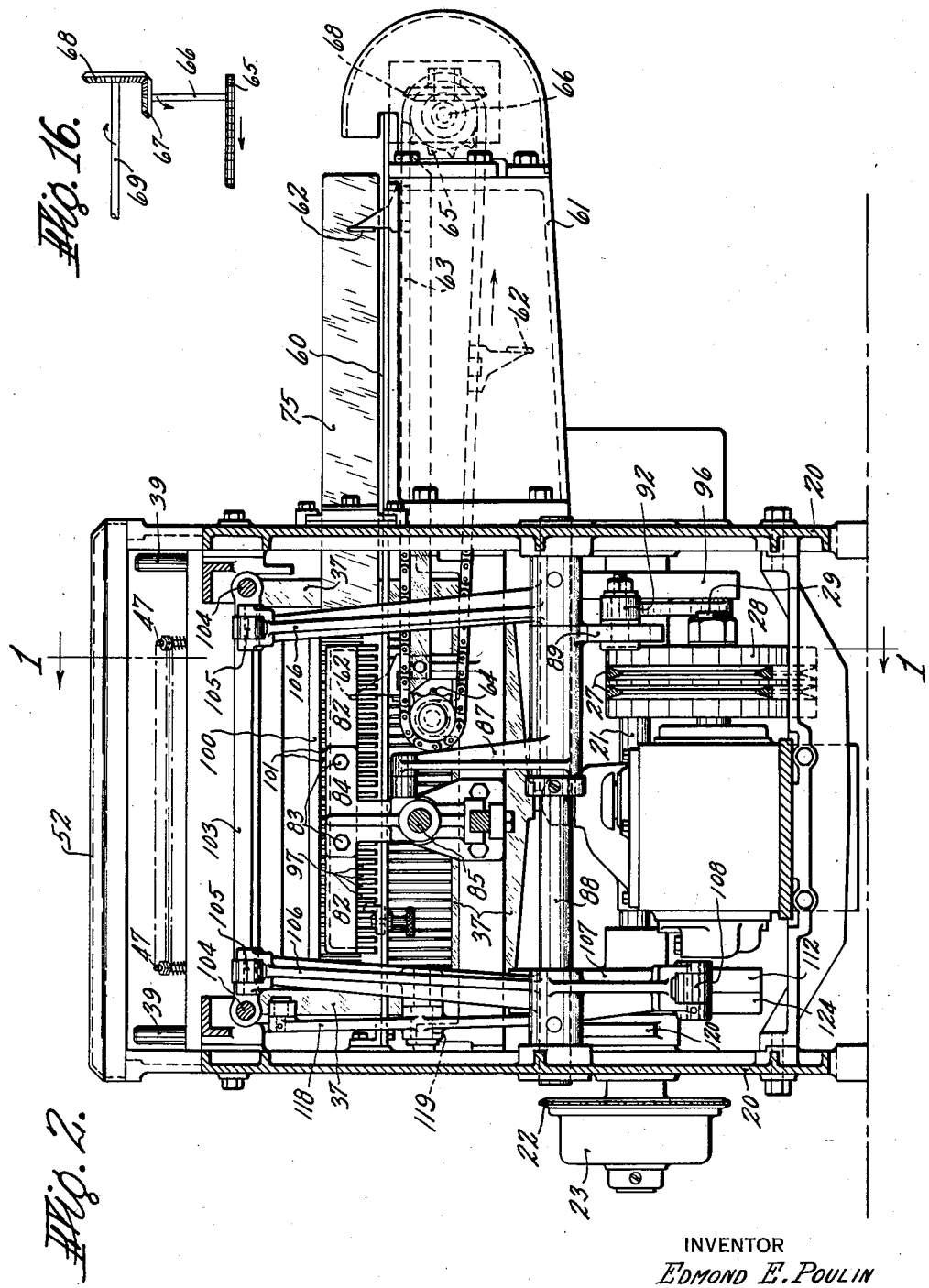

Sept. 14, 1937.  E. E. POULIN  2,092,857
BREAD SLICING MACHINE
Filed Sept. 8, 1934   5 Sheets-Sheet 3
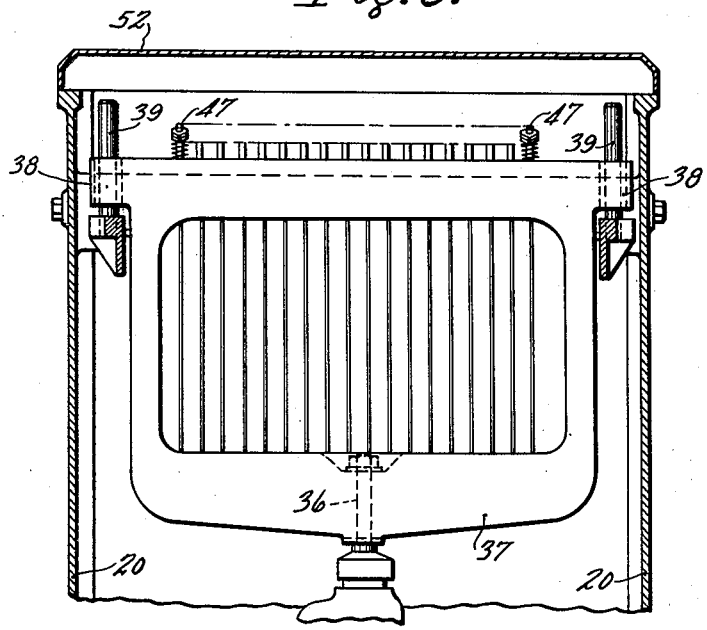
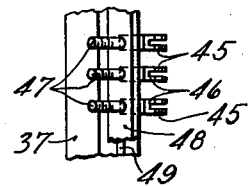
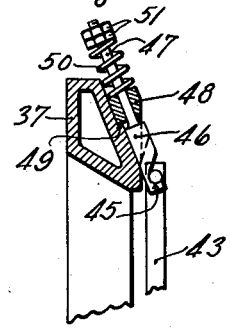
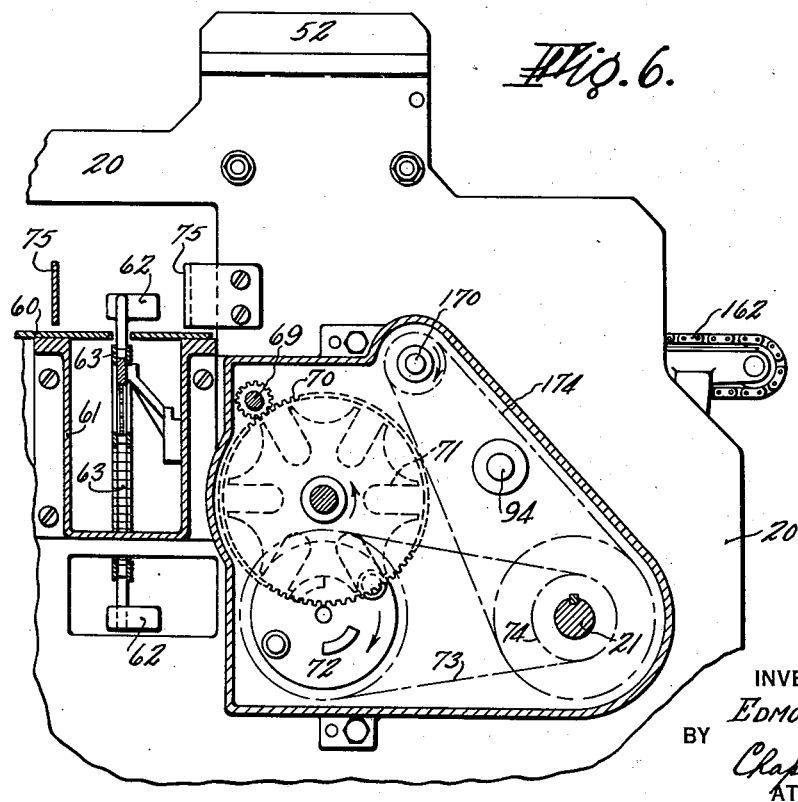
INVENTOR
*Edmond E. Poulin*
BY
*Chapin + Neal*
ATTORNEYS

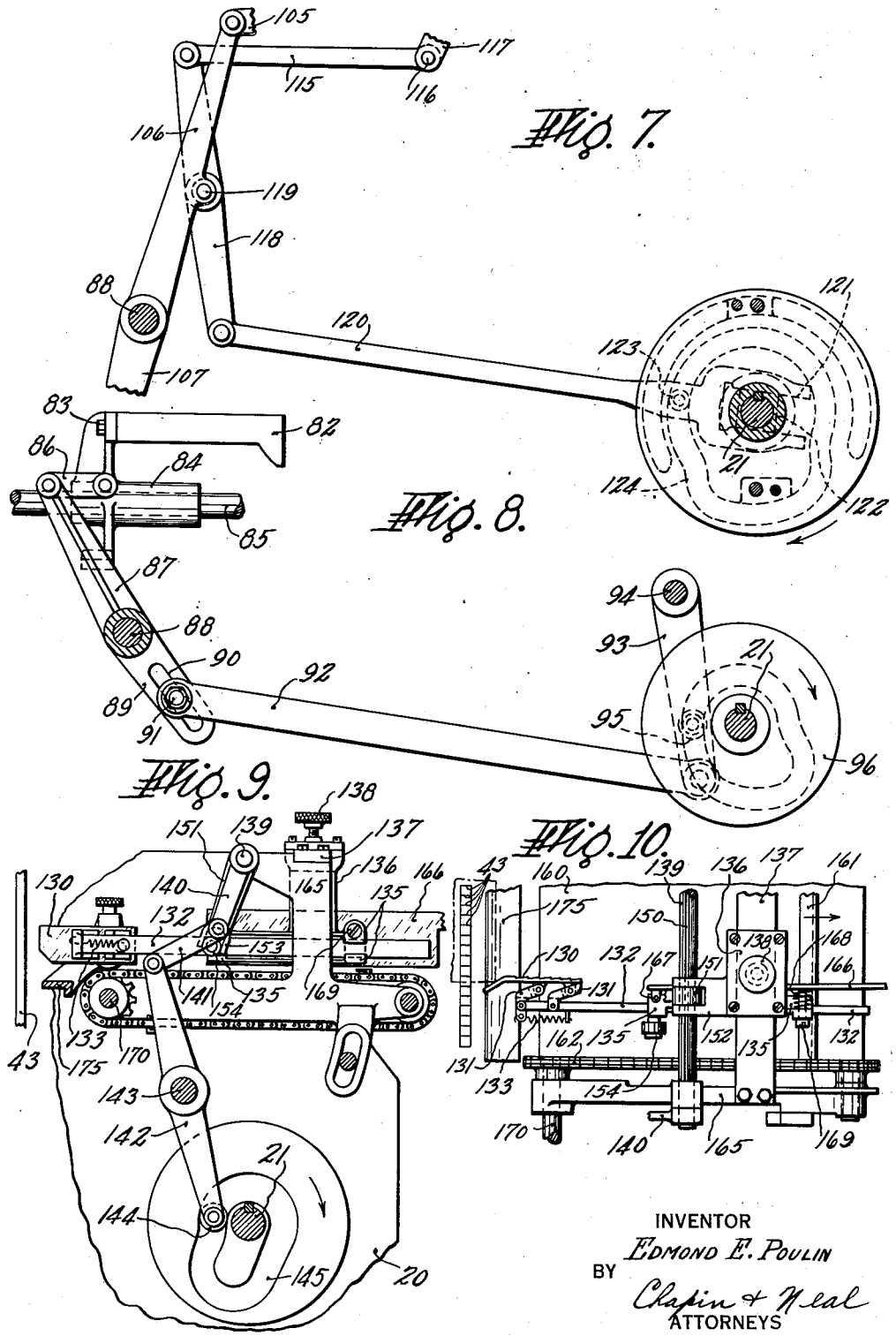

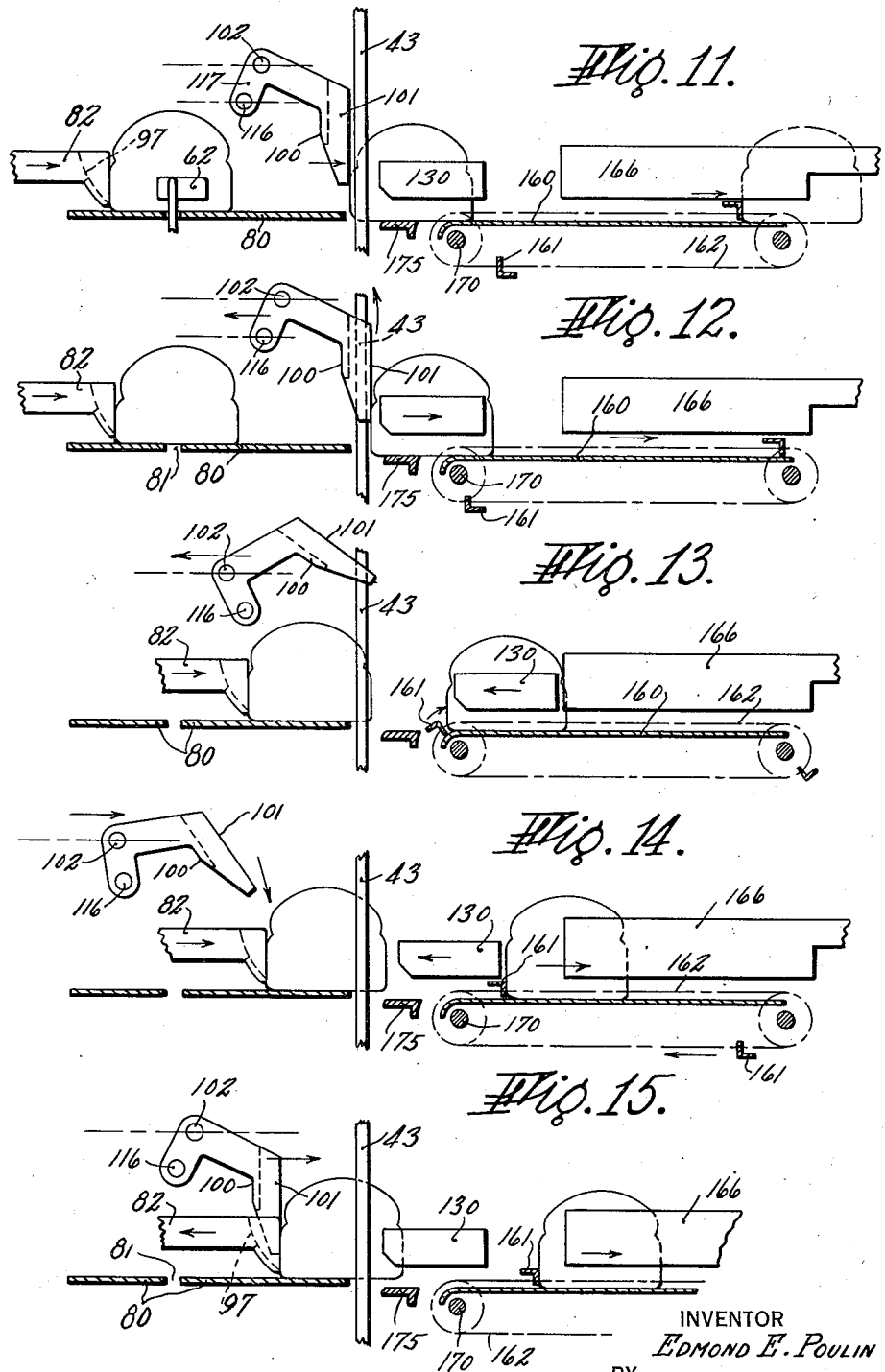

Patented Sept. 14, 1937

2,092,857

UNITED STATES PATENT OFFICE 2,092,857

BREAD SLICING MACHINE

Edmond E. Poulin, Springfield, Mass., assignor to National Bread Wrapping Machine Co., Springfield, Mass., a corporation of Massachusetts Application September 8, 1934, Serial No. 743,239

11 Claims. (Cl. 146—153)

This invention relates to bread slicing machines and has particular reference to mechanism for carrying the loaves through the slicing knives. In prior slicing machines it has been customary to carry the bread from one side to the other of the slicing knives by a reciprocating plunger having fingers spaced to pass between the knives. While this type of mechanism is simple, it is essentially slow in operation because of the long inactive period during the rearward travel of the plunger in which no loaf is being forwarded. The use of an endless series of pushers on a conveyor chain is general usable only with cutters of the disc type and, while rapid in operation, it is not adaptable to cutters of the band or reciprocating saw types. Furthermore, in order to change from one thickness of slice to another this type of loaf carrier requires the replacement of a large number of pushers in order to provide fingers of the proper spacing for passing between the cutting discs. A third but even less satisfactory type of feed has sometimes been employed in which the loaves are pushed through the cutters solely by the pressure of a file of loaves behind them. The main difficulty with this type of feed is that, particularly when soft bread is being sliced, the loaves are under such a heavy pressure that they become distorted. Furthermore, this method of feeding has the disadvantage that the machine will not clear itself when it is stopped, and some way must be provided to force the last loaf through the blades.

It is the object of the present invention to provide a mechanism for feeding the loaves which is adaptable to any type of cutting mechanism and which will avoid the disadvantages of prior forms, as outlined above. A further object is to provide for a substantially continuous movement of the loaf through the cutting blades without requiring the use of an endless series of pushers, thereby increasing the rapidity with which a series of loaves can be handled. A further object is to provide a plurality of successively acting mechanisms coacting to carry the loaf through the cutters without any substantial interruption in its forward movement. A further object is to provide a slicing machine of the reciprocating blade type in which a substantially increased number of loaves can be sliced in a given period of time. A further object is to provide a loaf forwarding mechanism having a minimum of parts to be interchanged when the thickness of the slice is varied. A further object is to provide a mechanism which will handle loaves of any of the various shapes met with and, in particular, to handle the so-called hearth baked loaves which are very irregular in contour. A further object is to provide a mechanism which may be used either in synchronism with a wrapping machine or separately. Additional objects will appear from the following description and drawings.

Referring to the drawings:

Fig. 2 is a section on line 2—2 of Fig. 1;

Fig. 3 is a detail section on line 3—3 of Fig. 1;

Fig. 4 is a top plan detail of the knife mounting;

Fig. 5 is a sectional detail of the knife mounting;

Fig. 6 is a detail of the driving mechanism for the cross feed mechanism;

Fig. 7 is a detail of the drive for one of the pushing elements;

Fig. 8 is a detail of the drive for another of the pushing elements;

Fig. 9 is a detail of the mechanism which receives the sliced loaf from the cutters;

Fig. 10 is a detail plan of the mechanism shown in Fig. 9;

Figs. 11 to 15 are diagrammatic views illustrating the progress of a loaf through the machine; and Fig. 16 is a detail of certain driving mechanism.

Figure 1:
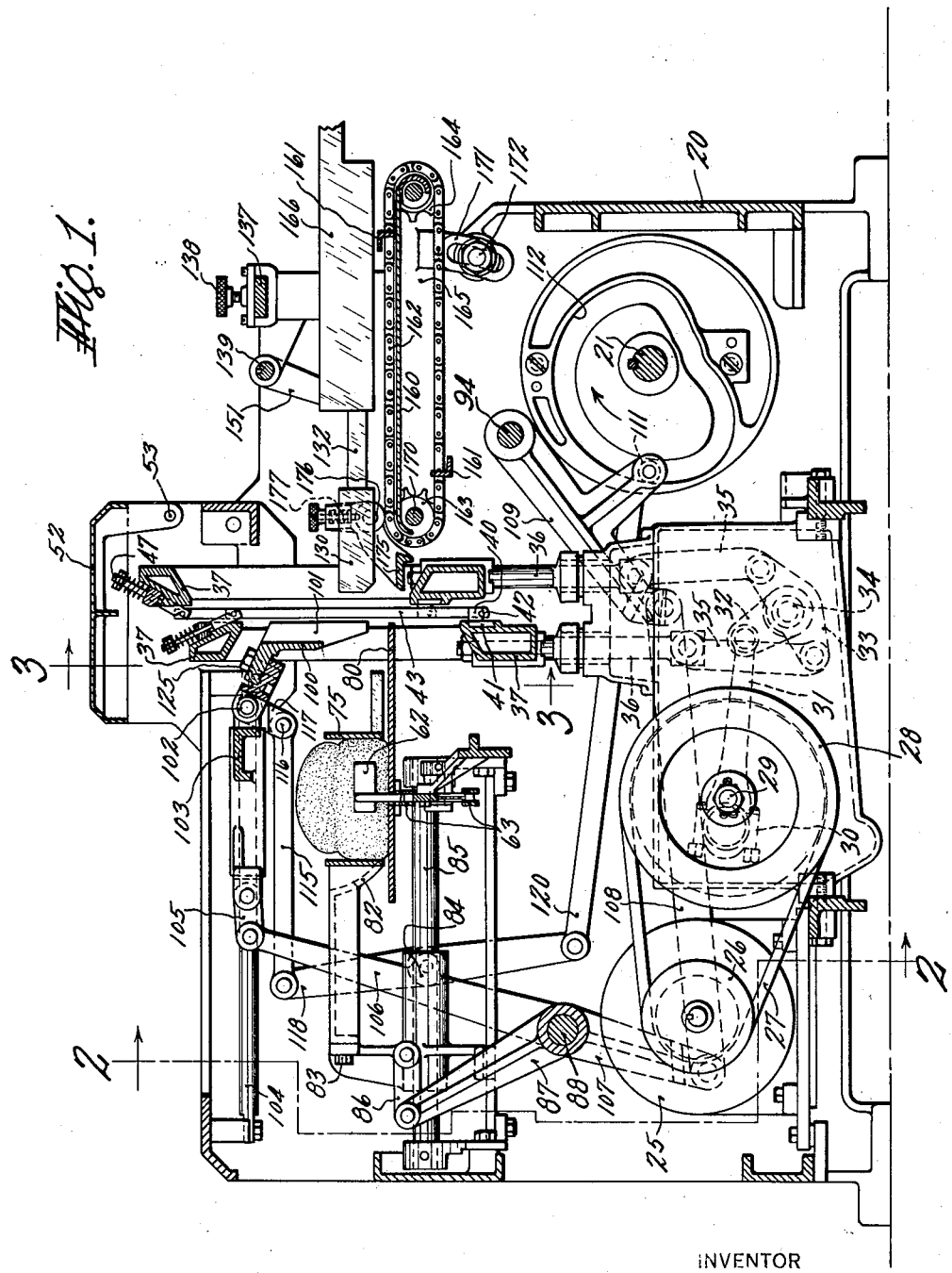
Fig. 1 is a side elevation of the machine, taken in section on line 1—1 of Fig. 2.

The machine is mounted upon a frame 20 in which is journalled a main drive and cam shaft 21. This shaft is preferably driven from a wrapping machine by a sprocket 22 acting through a clutch and overload release 23. All of the mechanism for forwarding the loaf is controlled by the shaft 21 and therefore acts in synchronism with the wrapping machine, while a separate drive is provided for the knives. A knife driving motor 25 is mounted on the frame of the machine and bears a pulley 26 connected by a belt 27 with a flywheel 28 on a shaft 29. This shaft bears a crank 30 joined by a connecting rod 31 with an arm 32 extending from a rocker 33 on a shaft 34. To each end of the rocker are pivoted links 35 joined at their upper ends to push rods 36 suitably journaled in the frame for vertical reciprocation. A knife frame 37 is mounted on each of the push rods and has extensions 38 at its upper ends bearing on rods 39 fixed on the frame. As the rocker is reciprocated by the crank the frames 37 will be raised and lowered alternately with great rapidity and smoothness.

Referring particularly to Figs. 1, 4, and 5, each knife frame carries a block 40 received and bolted in place in a dovetailed groove 41 formed in the frame, the block having a projecting fingered portion notched on its under side to receive pins 42 secured to the knife blades 43. Similar pins on the upper ends of the knives are received in slots 45 formed in knife holders 46, the shanks 47 of which slide through holes in aluminum blocks 48. These blocks, of which there is one to each frame, rest on shoulders 49 formed in the frame and, similarly to blocks 41, are screwed or bolted in place. Above the block 48 springs 50 encircle the shanks 47 and bear against nuts 51 to give to the holding members 46 a constant upward tendency. Each knife blade is thus individually held under a controllable tension. It will be observed from Fig. 1 that the knife holders on the two frames are oppositely directed so that the knives lie in the same plane transversely of the machine. They are reciprocated rapidly by the mechanism described, one set going up while the alternately arranged set is going down. To guard against accidents the knives are preferably covered by a plate 52 hinged to the frame at 53 so that it may be lifted when desired.

Mounted on the frame is a cross feed table 60 supported on a sidewardly extending bracket 61. Along this table the loaves are pushed by a series of paddles 62 carried by a chain 63. This chain passes around sprockets 64 and 65, the latter of which is carried by a shaft 66 (Fig. 16). A gear 67 on this shaft meshes with a gear 68 on a shaft 69 driven as shown in Fig. 6. A pinion on the shaft 69 is driven by a gear 70 upon the driven element of a Geneva movement 71. The driver 72 is coupled by a chain 73 with a sprocket 74 on the main drive shaft 21 referred to above. Intermittent motion is thus given to the paddles, with the periods of rest occurring when the loaves are successively positioned in front of the knives. During their travel along the table 60 the loaves are guided by side plates 75. Since this cross feed mechanism is driven from the shaft 21 it moves in synchronism with the wrapping machine and the loaves will therefore be delivered into the slicing device in timed relation to the wrapping mechanism.

A table 80, upon which the loaves are delivered by this cross feed mechanism, is formed as a continuation of the table 60, and it as well as the cross feed table is slotted at 81 (Fig. 15) to permit passage of the paddles 62. A pusher 82 receives the loaves from the cross feed conveyor and forwards them at right angles thereto substantially up to or preferably partially through the knives, as is shown in Figs. 11 to 15. This pusher is detachably connected at 83 to a slide 84 mounted for reciprocation upon guide rods 85. A link 86 joins this slide to an arm 87 free on a shaft 88. A lower extension 89 connected to this arm is slotted at 90 (Fig. 8) to receive an adjustable pivot pin 91 so that the stroke of the pusher may be varied. A link 92 connects this arm to an arm 93 pivoted to the frame at 94 and bearing a roll 95 engaging a cam 96 on the main shaft 21.

The pusher 82 is provided with slots 97 to permit the passage of a second pusher in the manner illustrated in Fig. 15. This second pusher 100 is formed with extending fingers 101 adapted to pass between the cutting blades 43 and is pivoted at 102 to a carriage 103 (Fig. 1) mounted for reciprocation upon guide rods 104. Links 105 join this carriage to arms 106 fixed on the shaft 88. An arm 107 also fixed to this shaft is coupled by a link 108 with a rocker 109 pivoted to the frame at 94. This rocker carries a roll 111 engaging a cam 112 on the main shaft 21. The linkage described gives to the carriage 103 a back and forth motion only. The tilting of the pusher 100, illustrated in Figs. 11 to 15, is accomplished by mechanism to be described.

In order to tilt the pusher 100 a link 115 is pivoted at 116 to a carrier 117 upon which the pusher itself is mounted. This link is joined to a rocker 118 pivoted at 119 to one of the arms 106 previously described. A push rod 120 (Fig. 7) is also connected to the rocker 118 and is slotted at its other end at 121 to embrace a block 122 loosely mounted upon the shaft 21. The link also bears a roll 123 engaging a cam 124 on the main shaft. It will be seen that the cam 124 gives a motion to the rocker which is varied somewhat by the motion of the pivot 119, the joint effect of both motions being to cause the pusher 100 to move forwardly in a straight line, as shown in Figs. 15, 11, and 12; and then to tilt upwardly as in Figs. 13 and 14 to clear the loaf on its rearward stroke. As the pusher finally reaches its normal pushing position its fingers 101 pass down into the slots 97 in the pusher 82, thus permitting the second pusher to engage the loaf as soon as the first pusher has completed its forward movement. It will be noted that the pivot 102 is located to the rear of the loaf contacting surface of the pusher and above the level of the loaf. Since the pusher swings upwardly upon this pivot as the pivot starts its rearward motion, and since due to the position of the pivot described above the pusher in its upward motion will swing slightly forwardly relatively to the pivot; the combined effect will be to make the loaf contacting part of the pusher move rearwardly at a slower rate than the pivot. This shifting forwardly of the pusher makes it possible to have the loaf being moved by pusher 82 in a somewhat more advanced position when the pusher 101 starts back, and decreases the necessary stroke of both pushers. The second pusher 100 carries the loaf completely through the knives into the position of Fig. 12, and for this purpose the fingers 101 are provided. As this necessitates a change in the spacing of the fingers when the spacing of the knives is varied, the pusher is detachably mounted upon its carrier 117, as by bolts 125.

As the loaf passes through the knives it is received by end gripping plates 130 which preferably grasp the loaf before the end slices have a chance to be completely separated from the body. This is particularly advantageous in the case of rounded or hearth baked bread in which the end slices are of considerably less width than those in the center of the loaf. Any possibility of serious displacement of these slices is thus avoided. These end plates are preferably serrated, as shown in Fig. 10, and are flared outwardly in a direction toward the knives so that the loaf will be received easily between them. The plates are supported upon parallel motion links 131 pivoted upon a slide 132, one of the links having a spring 133 attached to it. The plates are thus given a tendency to press against the end of the loaf, but can be forced outwardly while retaining their parallel relation.

The slides 132 reciprocate in guides 135 attached to a frame 136. As it is necessary to change the spacing of the end grip plates in accordance with the length of the loaves being acted on, the frames 136 are slidably mounted upon a cross piece 137, being held in adjusted position as by a screw 138. Upon a cross shaft 139 is mounted an arm 140 coupled by a link 141 with a rocker 142 pivoted to the machine frame at 143. The lower end of this rocker has a roller 144 engaging a cam 145 on the main shaft 21. The cross shaft 139 has a key-way 150 formed in it in which engage keys on arms 151 carried by extensions 152 of the frames 136. The arm 151 appearing in Fig. 10 has been broken off in order to disclose parts lying beneath it. As shown in Fig. 9, the lower end of each of these arms 151 is forked as at 153, so as to embrace a roller 154 carried on the slide 132. As the shaft 139 is rocked the slides 132 and consequently the end gripping plates 130 will be reciprocated back and forth, as indicated in Figs. 11 to 15.

The plates 130 grasp the ends of a loaf as it is being pushed through the knives and carry it forwardly on to a plate 160. When the loaf has been deposited on this plate it is carried along by pushers 161 mounted on chains 162. These chains are mounted on sprockets 163 and 164, the latter of which is journaled in the frame 165 which carries the shaft 139 and the cross piece 137. In their travel along the plate 160 the loaves are guided by side plates 166, each of which is pivoted at its forward end at 167 to one of the guides 135. At a more rearward point the side guides are pressed inwardly by springs 168 mounted on studs 169 so that the plates may yield if necessary under the pressure of a loaf.

In order to adjust the parts to the receiving end of the wrapping machine, the delivery conveyor and the attendant parts are mounted so that they can be varied slightly in the elevation of the delivery end of the conveyor. For this purpose the frame 165 is pivoted on the shaft 170 which carries the sprocket 163 and at its other end is provided with a sliding extension 171 held to the main machine frame by a bolt 172. The shaft 170, as shown in Fig. 6, is driven by a chain and sprocket connection 174 with the main shaft 21. A bridge plate 175 is preferably employed to guide the bottom of the loaves from the plate 80 on to the plate 160. In order to permit this bridge plate to be swung out of the way when the knives are to be replaced, it is pivotally mounted on shafts 176, being held in place by a spring plunger 177.

Referring to Figs. 11 to 15, it will be seen that the loaves are received from the paddles 62 by the plunger 82 and are carried by it up to and, in the case of a wide loaf, partially through the cutting blades 43. Before the pusher 82 starts its receding movement, however, the plunger 100 has descended with its fingers 101 in the slots 97 of the plunger 82. The plunger 100 then starts forward, carrying the loaf, as shown in Figs. 11 and 12, completely and positively through the knives. As the loaf emerges from the knives it passes between the spring plates 130 which, as they receive the loaf, start ahead, synchronizing in their speed with the plunger 100. Any short end slices will thus be held to the main body of the loaf and will be carried along with no tendency to displacement. As soon as the sliced loaf is thoroughly placed on the plate 160 it is carried ahead by the pushers 161, the pressure of the side plates 130 on the end slices and the later pressure of the side guides 166 holding the loaf assembled.

I claim:

1. A bread slicing machine comprising slicing knives, a reciprocating notched pusher movable to carry a loaf into but not completely through the knives, a second pusher having fingers to pass between the knives, and means for moving the second pusher in such a path that it first clears a loaf being advanced by the first pusher, then moves to the rear of the loaf with its fingers extending into the notches of the first pusher, and finally advances the loaf still further through the knives.

2. A bread slicing machine comprising slicing knives, means for pushing a loaf partway through the knives, a fingered pusher engaging the loaf to carry it completely through the knives, and loaf end grasping means operable to grasp the ends of a partially cut loaf and to move with the fingered pusher to prevent separation of the slices.

3. A slicing machine comprising slicing knives, means for carrying a loaf through the knives, opposed plates receiving the loaf from the knives, a reciprocating carriage on which the plates are mounted, parallel motion linkages connecting the plates to the carriage, and spring means urging the plates together.

4. A slicing machine comprising slicing knives, means for carrying a loaf through the knives, opposed plates receiving the loaf from the knives, a reciprocating carriage on which the plates are mounted, parallel motion linkages connecting the plates to the carriage, and spring means urging the plates together, said linkages being set so as to cause the plates to grasp the loaf tightly as the carriage is moved away from the knives.

5. A bread slicing machine comprising slicing knives, a support for the loaf during its passage through the knives, a reciprocating pusher movable to carry a loaf to the knives, a carriage reciprocable adjacent said pusher, a second pusher having fingers to pass between the knives and pivotally mounted on the carriage, and means for rotating the second pusher on its pivot during the reciprocating cycle of the carriage to cause it to clear a loaf being advanced by the first pusher.

6. A bread slicing machine comprising slicing knives, a support for the loaf during its passage through the knives, a reciprocating pusher movable to carry a loaf to the knives, a carriage reciprocable adjacent said pusher, a second pusher having fingers to pass between the knives and pivotally mounted on the carriage, and means for rotating the second pusher on its pivot during the reciprocating cycle of the carriage to cause it to clear a loaf being advanced by the first pusher, the first pusher having notches in its forward surface to receive the fingers of the second pusher.

7. A bread slicing machine comprising a frame, slicing knives, a support for the loaf during its passage through the knives, a reciprocating pusher movable to carry a loaf to the knives, a carriage reciprocable above said pusher, a second pusher having fingers to pass between the knives and pivotally mounted on the carriage, a lever pivoted on the frame, means for oscillating the lever, means coupling the lever to the carriage, a second lever pivoted upon a portion of the first lever between its pivot on the frame and its coupling to the carriage, means for coupling the second lever to the second pusher so as to rock said pusher on its pivot, and means to give to the second lever a motion independent of the motion given to it by the first lever and serving to rock said second pusher upwardly during the rearward stroke of the carriage to clear a loaf being advanced by the first pusher.

8. A bread slicing machine including slicing knives, a support for a loaf during its passage through the knives, and mechanism for forwarding the loaf into the knives comprising a reciprocating pusher, a second fingered pusher, and means for moving the second pusher forwardly to carry the loaf toward the knives and rearwardly over a loaf being advanced by the first pusher, the paths of the two pushers intersecting, the first pusher having slots to receive the fingers of the second pusher during the movements of the two pushers in the intersecting portions of their paths.

9. A bread slicing machine including slicing knives, a support for a loaf during its passage through the knives, and mechanism for forwarding the loaf into the knives comprising a reciprocating pusher, a second fingered pusher, a pivot for the second pusher located to the rear of the loaf contacting face of the pusher, means for moving the pivot forward and back, and means for tilting the pusher upon said pivot during its rearward motion to cause it to clear a loaf being advanced by the reciprocating pusher, said moving and tilting means being so constructed that the paths of the two pushers intersect, the first pusher having slots to receive the fingers of the second pusher during the movements of the two pushers in the intersecting portions of their paths.

10. A bread slicing machine comprising a frame, slicing knives, a support for the loaf during its passage through the knives, a reciprocating pusher, a carriage reciprocable above said pusher, a second pusher pivotally mounted on the carriage, a lever pivoted on the frame, means for oscillating the lever, means coupling the lever to the carriage, a second lever pivoted upon a portion of the first lever between its pivot on the frame and its coupling to the carriage, means for coupling the second lever to the second pusher so as to rock said pusher on its pivot, and means to give to the second lever a motion independent of the motion given to it by the first lever and serving to rock said second pusher upwardly during the rearward stroke of the carriage to clear a loaf being advanced by the first pusher.

11. A bread slicing machine comprising a frame, slicing knives, a support for the loaf during its passage through the knives, a reciprocating pusher provided with grooves in its leading face, a carriage reciprocable above said pusher, a second pusher pivotally mounted on the carriage and provided with fingers adapted to interfit with the grooves in the first pusher, a lever pivoted on the frame, means for oscillating the lever, means coupling the lever to the carriage, a second lever pivoted upon a portion of the first lever between its pivot on the frame and its coupling to the carriage, a second lever pivoted upon a portion of the first lever between its pivot on the frame and its coupling to the carriage, means for coupling the second lever to the second pusher so as to rock said pusher on its pivot, and means to give to the second lever a motion independent of the motion given to it by the first lever and serving to rock said second pusher upwardly during the rearward stroke of the carriage to clear a loaf being advanced by the first pusher and then to descend into the grooves of the first pusher.

EDMOND E. POULIN.